United States Patent [19]

Stroud

[11] 4,192,397
[45] Mar. 11, 1980

[54] BATTERY LOCATING DEVICE

[75] Inventor: Robert J. Stroud, Reading, England

[73] Assignee: Lansing Bagnall Limited, Hampshire, England

[21] Appl. No.: 913,895

[22] Filed: Jun. 8, 1978

[30] Foreign Application Priority Data

Jun. 15, 1977 [GB] United Kingdom ............... 25130/77

[51] Int. Cl.² .................. B60K 1/04; B61D 45/00; B65J 1/22
[52] U.S. Cl. .................................... 180/68.5; 248/503
[58] Field of Search ............... 180/65 B, 68.5; 104/34; 105/464, 50, 51, 463, 465, 473, 475, 476; 429/100, 99, 96, 97, 98; 248/503, 500, 681, 680, 510, 503.1, 506; 280/179 R

[56] References Cited

U.S. PATENT DOCUMENTS

| 942,049 | 12/1909 | Barney | 248/681 |
|---|---|---|---|
| 1,486,434 | 3/1924 | Holden | 429/99 |
| 2,270,563 | 1/1942 | Schnebelen | 429/98 |
| 2,902,246 | 9/1959 | Lapsley | 105/464 |
| 3,116,702 | 1/1964 | Stough | 105/463 |
| 4,033,424 | 7/1977 | Evans | 248/503 |

FOREIGN PATENT DOCUMENTS 255644 7/1926 United Kingdom .................. 105/51

Primary Examiner—Joseph F. Peters, Jr.
Assistant Examiner—Milton L. Smith
Attorney, Agent, or Firm—Cushman, Darby & Cushman

[57] ABSTRACT

A device for locating a heavy component such as an electrical battery on a chassis such as that of an industrial lift truck, and for preventing dislodgement of the battery even during excessive tilting of the chassis.

The apparatus includes a frame formed from two spaced parallel channel members (11) which extend longitudinally of the truck and are bolted to the chassis (10). In the upper surface of each channel member (13) is a downwardly extending slot (19) in which a respective spigot (18) of the battery (16) is received when the battery (16) is located between the two channel members (13). A respective flap (21) pivotally attached to each channel member (13) adjacent its slot (19) is then rotated about its pivot into an operative position in which it covers a substantial portion of the slot (19) the end of spigot (18) being accommodated in an aperture (30) in the flap (21). To retain the flap (21) in its operative position, a second flap or latch (25) pivotally mounted on flap (21) is rotated about its pivot until wings (31) on flap (25) engage an inclined surface (15) of the respective channel member (13). Thus the flap (21) cannot be released from its operative position until the wings (31) of the flap (25) are disengaged from surfaces (15).

As long as the flaps (21) are held in their operative positions by the respective flaps (25), the engagement of the spigots (18) in slots (19) and apertures (30) prevents dislodgement of the battery (16) even during excessive tilting of the chassis (10).

17 Claims, 3 Drawing Figures

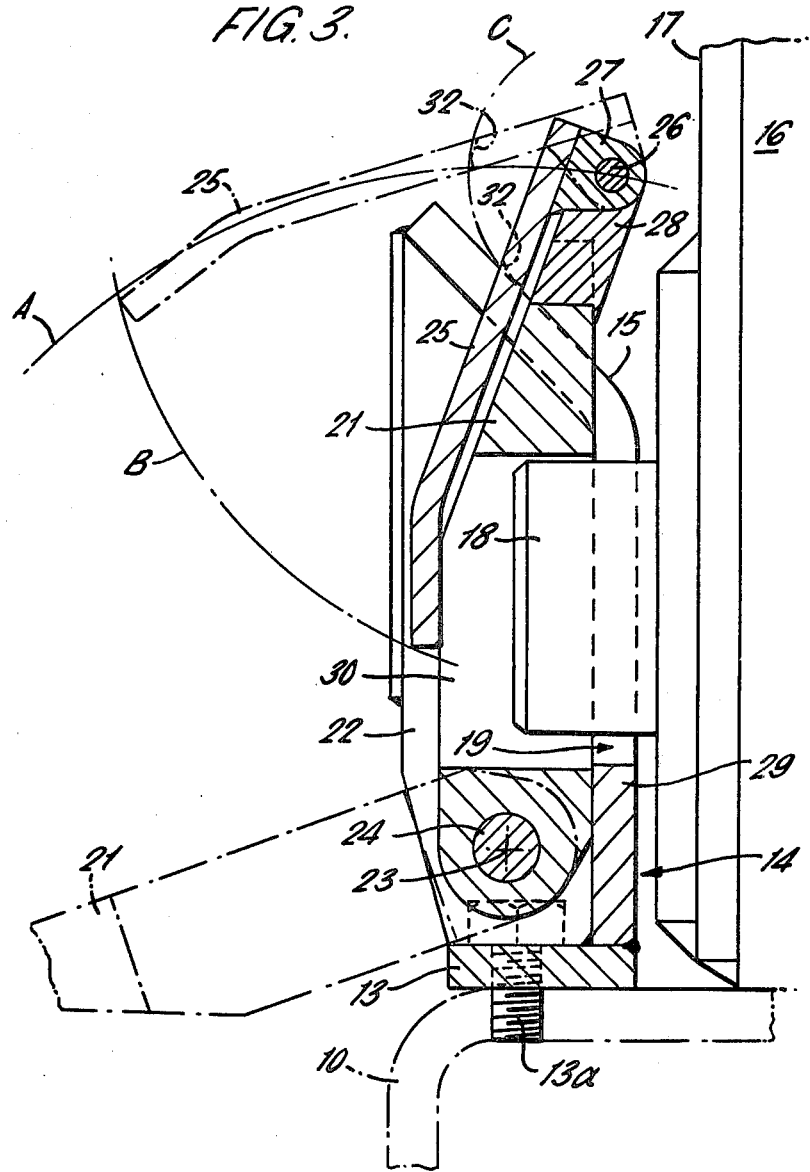

BATTERY LOCATING DEVICE

FIELD OF THE INVENTION

This invention relates to a device for locating an electrical battery or like heavy component on a chassis, particularly on the chassis of an industrial lift truck.

BACKGROUND OF THE INVENTION

A battery of an industrial or fork lift truck is usually mounted on the truck chassis by means of a number of locating pins which protrude from the underside of the battery for engagement within correspondingly placed holes in the upper surface of the chassis, the weight of the battery being usually sufficient to retain the battery in place. However, if the truck is likely to be excessively tilted, as may occur for example if the truck is slung from a crane or helicopter, during transit to an oil rig, say, then there is a danger that the line of action of the center of gravity will shift sufficiently relatively to the locating pins to pull the pins out of their respective holes and the battery will fall off the truck. The present invention is concerned with the position of a locating device for retaining a battery or like component, on the truck chassis even during excessive tilting thereof.

SUMMARY OF THE INVENTION

According to the invention, there is provided an assembly for locating on a chassis a heavy component having a laterally extending location spigot, the assembly comprising a frame, adapted to be mounted on a chassis, for receiving such a heavy component, there being a slot formed in a side member of the frame, which slot extends downwardly from an upward facing surface of said side member when the frame is mounted on a chassis for the accommodation of said location spigot of a heavy component received by the frame, and spigot restraining means adjacent said slot comprising a flap member which is pivotably mounted on the side member of the frame adjacent said slot for pivotal movement relative to the frame between an inoperative position in which it extends laterally outwardly of the side member of the frame and an operative position in which it covers a substantial portion of the slot, there being a recess in the flap member for accommodating the end of said location spigot in said slot when the flap member is in its operative position, and a latch device for releasably securing the flap member to said side member of the frame when the flap member is in said operative position, the latch device being mounted on the flap member on the side of the recess therein remote from the pivotal connection between the side member of the frame and the flap member and being arranged for movement relative to the flap member to engage an adjacent portion of the side member of the frame when the flap member is in its operative position.

Conveniently, the latch device is a second flap member which is mounted on the first-mentioned flap member for pivotal movement relative thereto about an axis parallel to that of the pivotal connection between the first flap member and the side member of the frame into a locking position in which it lies over at least a part of the first flap member and engages the side member of the frame adjacent said slot therein when the first flap member is in its operative position.

Preferably said surface of the side member of the frame has a portion which, at least adjacent said slot, is inclined downwardly and inwardly when the frame is mounted on the chassis. Preferably, the frame is adapted to provide a seating for a heavy component to be located, a substantial portion of the surface of the frame which is uppermost when the frame is mounted on a chassis, including said surface of said side member being inclined inwardly and downwardly to facilitate correct location of a heavy component on said frame. Preferably also, the first flap member is pivotally connected to the side member of the frame adjacent the end of said slot which is lowermost when the frame is mounted on a chassis, for pivotal movement inwardly and upwardly from said inoperative to said operative position, said second flap member being pivotable relative to the first flap member inwardly and downwardly into its locking position once the first flap member is in its operative position, the second flap member having at least one projection for engaging the inclined surface of the side member of the frame adjacent the slot to inhibit pivotal movement of the first flap member out of its operative position until the second flap member is moved out of its locking position. In addition the walls of the slot are preferably inclined inwardly so that the slot is widest at its opening in said surface of said side member of the frame to facilitate the correct location of said spigot therein.

In practice, it is convenient for the frame to have a second side member on the opposite side of the frame to said first-mentioned side member, the second side member being formed with a slot identical to said slot in said first side member, there being a second respective spigot restraining means, identical to said first-mentioned spigot restraining means, located adjacent said slot in said second side member. In this way, it is possible for the frame to accommodate heavy components having a respective spigot extending laterally from each of a pair of opposite sides thereof. Preferably the frame comprises a pair of parallel spaced strip members which constitute said first and second side members of the frame and which are adapted to be fixedly mounted on a chassis, each strip member being conveniently bent along its length to provide said inclined portion of the surface of the frame.

BRIEF DESCRIPTION OF THE DRAWINGS

FIG. 3 is a sectional view of the locating assembly of FIG. 2, taken along line III—III therein.

DESCRIPTION OF PREFERRED EMBODIMENT

Figure 1:
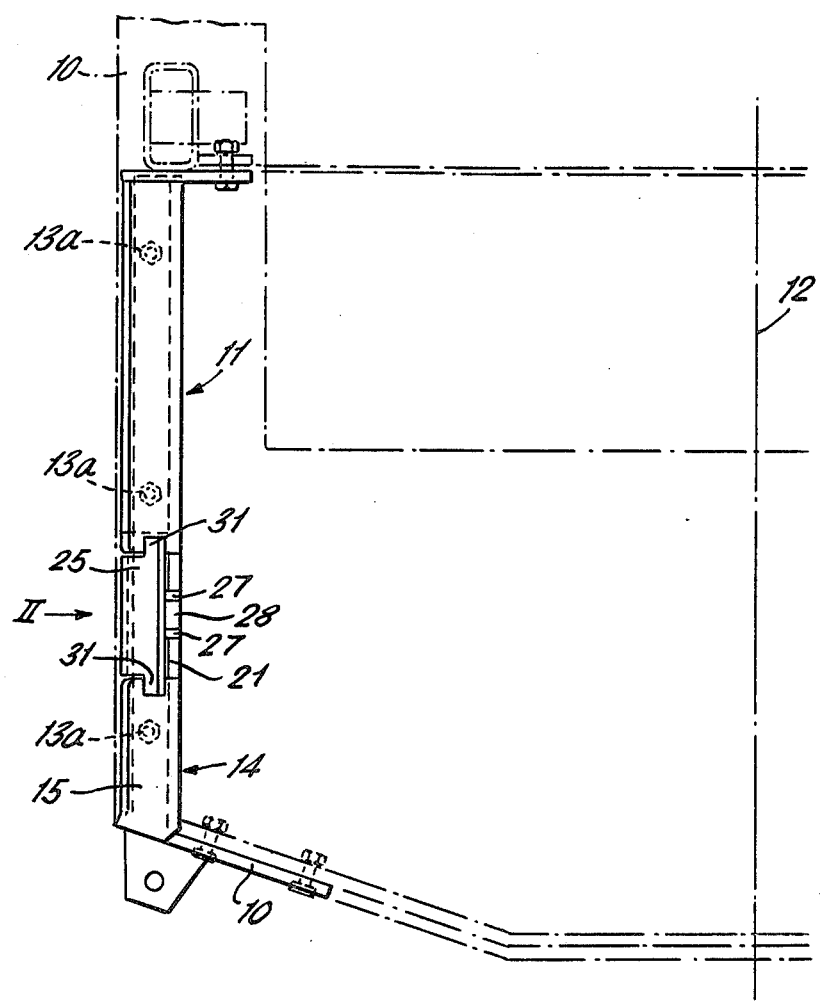
FIG. 1 is a diagrammatic plan view of a part of the rear end of a lift truck, showing one locating assembly according to the invention.

In the drawings, on the rear end of the chassis 10 of a lift truck are bolted two laterally spaced, parallel channel members 11 (only one being illustrated since the rear end of the truck is symmetrical about its longitudinal center line 12) which extend longitudinally of the truck. Each channel member 11 faces outwardly, being formed by a strip 13 which is bolted to the chassis by bolts 13a, and a second strip 14, which is welded to strip 13 and is upright with respect thereto. The strip 14 is bent at an oblique angle along its length to form the channel section so that the upper surface 15 of the strip 14 is downwardly and inwardly inclined, an arrangement which facilitates the correct locating of a battery 16 (FIG. 3) on the chassis 10 between the members 11.

The sides 17 of the battery 16 which are arranged to be adjacent the members 11 when the battery is thus located on the chassis are each provided with a respective laterally extending spigot 18, which is accommodated in a respective downwardly extending slot 19 in the adjacent strip 14. The sides of each slot 19 have portions 20 which, as best seen in FIG. 2, are inclined inwardly and downwardly in order to facilitate the correct location of the respective spigot 18 therein as the battery is inserted between the members 11 during its mounting on the chassis.

Since the means by which each spigot is retained in its respective slot 19 are identical, only one will now be described.

Figure 2:
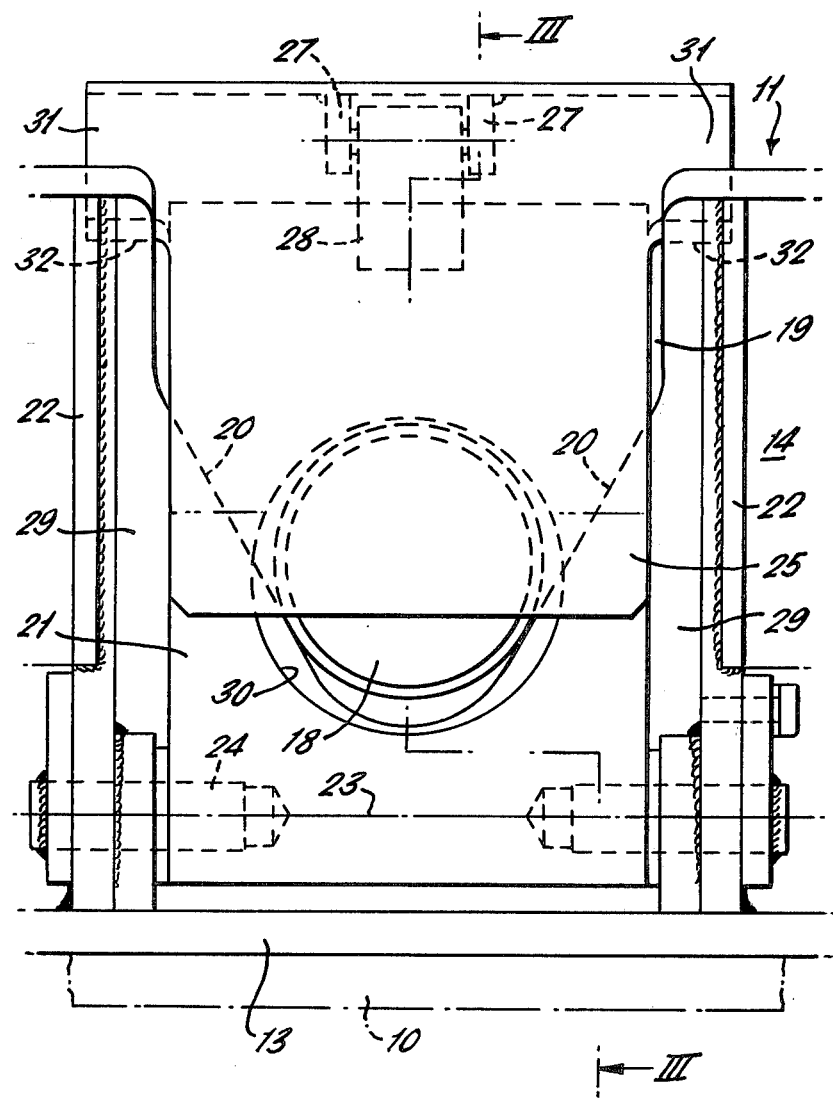
FIG. 2 is a diagrammatic view of the locating assembly of FIG. 1 viewed in the direction of arrow II.

As shown in FIGS. 2 and 3, a flap 21 is pivotally mounted between two flanges 22 which extend laterally outwardly of the strip 14, the flanges 22 being welded to the strips 13 and 14, the axis 23 of the pivotal connection 24 extending generally horizontally and being located adjacent the lower end of the slot 19. A second flap 25 is pivotally connected by a pin 26 to the free end of the flap 21. The pin 26 passes through aligned holes in two spaced projections 27 which are fixedly mounted on flap 25, and in a third projection 28 which is fixedly mounted on the flap 21, and is located between the projections 27. The projection 28 is oriented at an angle to the flap 21, for a purpose to be described hereinafter.

When the spigot is correctly located within its respective slot 19, the flap 21 is rotated about pin 24 relative to the strip 14 from an inoperative position, shown in chain dot lines in FIG. 3, in which it extends laterally outwardly of the strip 14, into an operative position shown in full lines in FIG. 3, in which it abuts against the upright lower portion 29 of the strip 14, so as to cover a substantial portion of the slot 19. The flap 21 is recessed, having an aperture 30 located between the two pins 24 and 26, the spigot 18 being accommodated within the aperture 30 when the flap 21 reaches its operative position. It will be seen from FIG. 2 that when the flap 21 is in its operative position, the spigot 18 is supported on the sloping walls 20 of the slot 19, and is prevented from upward movement out of the slot 19 by its engagement within the apertures 30 in flap 21.

During the inwardly and upward rotation of the flap 21 into its operative position, the axis of pin 26 between the flaps 21 and 25 follows a locus indicated in chain dot line A in FIG. 3, which passes above the level of the uppermost edge of surface 15 on the strip 14. Until the flap 21 reaches its operative position, the flap 25 is disposed at an angle to the flap 21, as shown in chain dot lines in FIG. 3, in order that wings or projections 31, best seen in FIG. 2, on the flap 25 can clear the uppermost edge of surface 15 of strip 14 during this rotation of the flap 21. Once flap 21 is in its operative position, the flap 25 is rotated downwardly and inwardly, its free end following the locus indicated by the chain dot line B in FIG. 3, until it lies over the outer surface of the flap 21. During this rotation of flap 25, the lower edges 32 of wings 31 thereof follow a locus indicated by chain dot lines C shown in FIG. 3, the dimensions of the flap 25 and its wings 31 being such that when the free end of the flap 25 contacts the outer surface of flap 21, the lower edges 32 of the wings 31 abut against the inclined surface 15 of the strip 14 on either side of the slot 19. The edges 32 are appropriately bevelled in order that the rotational movement of the flap 25 is not impeded by premature engagement between the edges 32 and surface 15 yet providing sufficient engagement between edges 32 and the surface 15 when the rotation of the flap 25 is completed to prevent outward rotation of the flap 21 out of its operative position unless the flap 25 is again raised. The angular orientation between the projection 28 and the flap 21 helps the wings on flap 25 to clear the upper edge of the surface 15 during rotation of flap 21 into its operative position.

Thus using the battery locating assembly described above, the battery can be guided into its correct position on the chassis 10 by means of the sloping surfaces 15 on the two strips 14, and also the sloping walls 20 of the two slots 19, and once the battery is in position, the spigots 18 can be readily and quickly retained in the slots 19 by the rotation first of the flaps 21 and subsequently of the flaps 25. The particular arrangement of the pairs of flaps 21, 25 enables quick release of the battery from its mounting on the chassis, yet providing retention of the battery in its mounting even if the truck is excessively tilted.

I claim:

1. An assembly for locating on a chassis a heavy component having a laterally extending location spigot, the assembly comprising a frame, adapted to be mounted on a chassis, for receiving such a heavy component, there being a slot formed in a side member of the frame, which slot extends downwardly from an upward facing surface of said side member when the frame is mounted on a chassis for the accommodation of said location spigot of a heavy component received by the frame, and a spigot restraining means adjacent said slot comprising a flap member which is pivotably mounted on the side member of the frame adjacent said slot for pivotal movement relative to the frame between an inoperative position in which it extends laterally outwardly of the side member of the frame and an operative position in which it covers a substantial portion of the slot, there being a recess in the flap member for accommodating the end of said location spigot of a heavy component received by said frame with its location spigot in said slot when the flap member is in its operative position, and a latch device for releasably securing the flap member to said side member of the frame when the flap member is in said operative position, the latch device being mounted on the flap member on the side of the recess therein remote from the pivotal connection between the side member of the frame and the flap member and being arranged for movement relative to the flap member to engage an adjacent portion of the side member of the frame when the flap member is in its operative position.

2. An assembly as claimed in claim 1, in which the latch device is a second flap member which is mounted on the first-mentioned flap member for pivotal movement relative thereto about an axis parallel to that of the pivotal connection between the first flap member and the side member of the frame into a locking position in which it lies over at least a part of the first flap member and engages the side member of the frame adjacent said slot therein when the first flap member is in its operative position.

3. An assembly as claimed in claim 2, in which said surface of the side member of the frame has a portion which, at least adjacent said slot is inclined downwardly and inwardly when the frame is mounted on a chassis.

4. An assembly as claimed in claim 3, in which the first flap member is pivotally connected to the side member of frame adjacent the end of said slot which is lowermost when the frame is mounted on a chassis, for pivotal movement inwardly and upwardly from said inoperative to said operative position, said second flap member being pivotable relative to the first flap member inwardly and downwardly into its locking position once the first flap member is in its operative position, the second flap member having at least one projection for engaging the inclined surface of the side member of the frame adjacent the slot to inhibit pivotal movement of the first flap member out of its operative position until the second flap member is moved out of its locking position.

5. An assembly as claimed in claim 3 or claim 4, in which the walls of the slot are inclined inwardly so that the slot is widest at its opening in said surface of said side member of the frame.

6. An assembly as claimed in claim 3, in which the frame is adapted to provide a seating for a heavy component to be located, a substantial portion of the surface of the frame which is uppermost when the frame is mounted on a chassis, including said surface of said side member being inclined inwardly and downwardly to facilitate correct location of a heavy component on said frame.

7. An assembly as claimed in claim 6, in which the first flap member is pivotally connected to the side member of frame adjacent the end of said slot which is lowermost when the frame is mounted on a chassis, for pivotal movement inwardly and upwardly from said inoperative to said operative position, said second flap member being pivotable relative to the first flap member inwardly and downwardly into its locking position once the first flap member is in its operative position, the second flap member having at least one projection for engaging the inclined surface of the side member of the frame adjacent the slot to inhibit pivotal movement of the first flap member out of its operative position until the second flap member is moved out of its locking position.

8. An assembly as claimed in claim 7, in which the walls of the slot are inclined inwardly so that the slot is widest at its opening in said surface of said side member of the frame.

9. An assembly as claimed in any one of claims 1 to 4 or 6 or 7, in which the frame has a second side member on the opposite side of the frame to said first-mentioned side member, the second side member being formed with a slot identical to said slot in said first side member, there being second respective spigot restraining means, identical to said first-mentioned spigot restraining means, located adjacent said slot in said second side member.

10. An assembly as claimed in claim 9, in which the frame comprises a pair of parallel spaced strip members constituting said first and second side members of the frame which are adapted to be fixedly mounted on a chassis.

11. An assembly as claimed in claim 6, in which the frame has a second side member on the opposite side of the frame to said first-mentioned side member, the second side member being formed with a slot identical to said slot in said first member, there being second respective spigot restraining means, identical to said first-mentioned spigot restraining means, located adjacent said slot in said second side member, and in which the frame comprises a pair of parallel spaced strip members constituting said first and second side members of the frame which are adapted to be fixedly mounted on a chassis, each strip member being bent along its length to provide said inclined portion of said surface of the frame.

12. An assembly as claimed in claim 1, in combination with a chassis on which the frame is fixedly mounted.

13. An assembly as claimed in claim 1 in combination with an industrial lift truck including a chassis, in which the frame is fixedly mounted on the chassis.

14. An assembly as claimed in any one of claims 1 to 4 or 6 or 7 in combination with an industrial lift truck including a chassis, in which the frame is fixedly mounted on the chassis, in further combination with a heavy component having a laterally extending location spigot, which component is located on the chassis of the truck by the engagement of said spigot within said slot in the frame, with the flap member of said assembly in its operative position and the latch device engaging the adjacent portion of the frame side member.

15. The combination of claim 14, in which the heavy component is an electrical battery for providing electrical power to operate the truck.

16. An assembly as claimed in claim 9 in combination with an industrial lift truck including a chassis, in which the frame is fixedly mounted on the chassis, in further combination with a heavy component having two laterally extending location spigots projecting one from each side thereof, said component being located on the chassis of the truck by the engagement of said spigots in the respective slots in the first and second side members of the frame, with the respective flap members of said assembly in their operative positions and each associated latch device engaging an adjacent portion of the respective frame side member.

17. The combination of claim 16, in which the heavy component is an electrical battery for providing electrical power to operate the truck.

* * * * *